Figure 1:
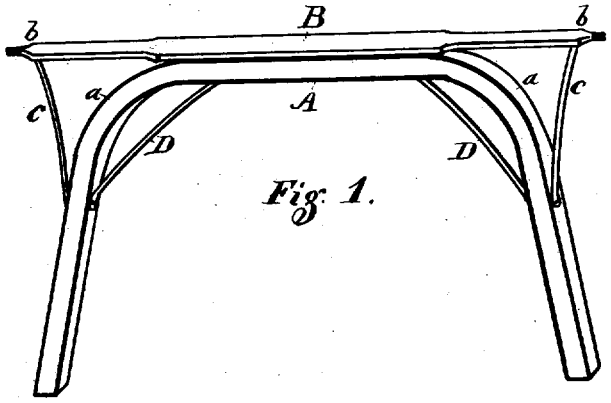

D. O. CARD.

Bent Knee and Beam for Sleighs.

Reissued May 4, 1875.

No. 6,408.

Witnesses
Alphens D. Smith
W. W. Richardson

Inventor.
Daniel O. Card
Per A. D. Smith
Attorney

THE GRAPHIC CO. PHOTO-LITH. 39 & 41 PARK PLACE, N.Y.

UNITED STATES PATENT OFFICE.

DANIEL O. CARD, OF RAWSONVILLE, OHIO, ASSIGNOR, BY MESNE ASSIGNMENTS, TO WILLIAM A. CRITTENDEN.

IMPROVEMENT IN BENT KNEES AND BEAMS FOR SLEIGHS.

Specification forming part of Letters Patent No. 70,408, dated November 5, 1867; reissue No. 6,408, dated May 4, 1875; application filed December 16, 1874.

*To all whom it may concern:*

Be it known that I, DANIEL O. CARD, of Rawsonville, county of Lorain, in the State of Ohio, have invented a new and Improved Bent Knee and Beam for Cutters and Sleighs or Sleds; and I do hereby declare that the following is a full and exact description thereof, reference being had to the accompanying drawing, and to the letters of reference marked thereon.

Figure 1 is a perspective view, in which A represents a bent piece of wood; B, a cross-piece or part of the beam. C C are braces under the ends of the cross-piece B. D D are braces to the knee and beam.

The nature of my invention in knees and beam for cutters, sleighs, &c., consists in the bending of a piece of wood, by which the knee and beam may be formed together without mortise or tenon in the form seen at *a*.

To enable others to fully understand my invention, I will describe its construction and practical advantages.

I take a piece of wood, A, of any desired form and shape for making said knee and beam, and, by the process employed for building material in the manufacture of carriages, sleighs, &c., I bend it in the form as seen at *a* in the accompanying drawing. Next I take a straight piece of wood or other suitable material, B, which I attach to the beam A, the ends projecting beyond the bend or knee *a* a sufficient distance, and upon ends *b* of which may be secured the fenders. The ends *b b* are supported by the brace C, of any convenient form. I also support the knees and beam by the braces D D, to strengthen them, thus forming a substantial knee and beam for the manufacture of sleighs and similar vehicles.

The advantages derived from this mode of construction are economy of labor and durability, combining strength and simplicity.

It will be seen that by bending the material a substantial beam and knees may be formed from one piece of wood A, requiring no mortise or tenon to connect them together, thus retaining the full strength of the material used.

They may be manufactured and supplied for the market much cheaper and of any desired size and style, like other portions of bent work or material for similar articles in this branch of industry.

What I claim as new in the construction of cutters, sleighs, &c., is—

1. As an article of manufacture, a bent knee and beam consisting of a single piece, substantially as set forth.

2. The combination of the rigidly-connected cross-piece B with the bent knee and beam, substantially as set forth.

DANIEL O. CARD.

Witnesses:
W. W. RICHARDSON,
A. D. SMITH.